United States Patent
Wan et al.

(10) Patent No.: US 10,041,599 B2
(45) Date of Patent: Aug. 7, 2018

(54) MULTI-WAY VALVE AND MULTI-WAY VALVE SKID THEREOF

(71) Applicants: WUHU KING-BULL INFORTEC PETROLEUM EQUIPMENT CO., LTD., Anhui (CN); KELAMAYI KING-BULL INFORTEC PETROLEUM EQUIPMENT CO., LTD., Xinjiang (CN)

(72) Inventors: Mingmin Wan, Xinjiang (CN); Jianshe Yao, Xinjiang (CN); Hao Wang, Anhui (CN); Liyun Zhu, Xinjiang (CN); Zhi Gao, Xinjiang (CN)

(73) Assignees: WUHU KING-BULL INFORTEC PETROLEUM EQUIPMENT CO., LTD., Anhui (CN); KELAMAYI KING-BULL INFORTEC PETROLEUM EQUIPMENT CO., LTD., Xingjiang (CN)

( * ) Notice: Subject to any disclaimer, the term of this patent is extended or adjusted under 35 U.S.C. 154(b) by 0 days.

(21) Appl. No.: 15/549,020

(22) PCT Filed: Mar. 25, 2015

(86) PCT No.: PCT/CN2015/075047
§ 371 (c)(1),
(2) Date: Aug. 4, 2017

(87) PCT Pub. No.: WO2016/123846
PCT Pub. Date: Aug. 11, 2016

(65) Prior Publication Data
US 2018/0017176 A1    Jan. 18, 2018

(30) Foreign Application Priority Data

Feb. 4, 2015 (CN) .......................... 2015 1 0059219

(51) Int. Cl.
*F16K 11/074* (2006.01)
*F16K 11/08* (2006.01)
(Continued)

(52) U.S. Cl.
CPC .............. *F16K 11/08* (2013.01); *F16K 27/06* (2013.01); *F16K 31/60* (2013.01)

(58) Field of Classification Search
USPC ..................................... 137/625.11
See application file for complete search history.

(56) References Cited

U.S. PATENT DOCUMENTS 2,840,109 A * 6/1958 Wadleigh .............. F16K 11/085
                                                        137/625.11
4,989,641 A * 2/1991 Jones ..................... F16K 11/085
                                                        137/625.11
(Continued)

FOREIGN PATENT DOCUMENTS

CN             1854534 A       11/2006
CN           201034178 Y        3/2008
(Continued)

OTHER PUBLICATIONS

International Preliminary Examination Report with Written Opinion for Application No. PCT/CN2015/075047 dated Nov. 24, 2015.
(Continued)

*Primary Examiner* — John Fox
(74) *Attorney, Agent, or Firm* — Jenkins, Wilson, Taylor & Hunt, P.A.

(57) ABSTRACT

Multi-position valve and a multi-position valve skid. The multi-position valve comprises an upper valve body, a lower valve body, and a rotary valve core that includes a valve core body and a protruding part and has an oil-directing passageway through the protruding part and the valve core body. The lower valve body has oil inlet passageways through lower end and upper ends. The oil outlet of the oil inlet passageway is on a circle having a radius of the distance from the oil inlet of the oil-directing passageway to its axis, the center of the circle being the axis of the valve core body. When the valve core body rotates, the oil-directing passageway can abut any of the oil inlet passageways. The oil inlet passageways in the multi-position valve run to the lower end of the lower valve body, such that after being connected.

9 Claims, 4 Drawing Sheets

(51) Int. Cl.
*F16K 31/60* (2006.01)
*F16K 27/06* (2006.01)

(56) References Cited

U.S. PATENT DOCUMENTS

| | | | |
|---|---|---|---|
| 5,927,330 A | 7/1999 | Minton et al. | |
| 6,367,504 B1 * | 4/2002 | Knapp | F16K 11/0743 |
| | | | 137/625.11 |
| 6,725,881 B1 * | 4/2004 | Beswick | A61C 1/0061 |
| | | | 137/625.11 |
| 8,100,143 B2 * | 1/2012 | Wan | E21B 34/02 |
| | | | 137/625.11 |
| 9,109,710 B2 * | 8/2015 | Hasse | F16K 11/0743 |

FOREIGN PATENT DOCUMENTS

| | | |
|---|---|---|
| CN | 203036009 U | 7/2013 |
| CN | 204458610 U | 7/2015 |

OTHER PUBLICATIONS

International Search Report for Application No. PCT/CN2015/075047 dated Nov. 24, 2015.

\* cited by examiner

MULTI-WAY VALVE AND MULTI-WAY VALVE SKID THEREOF

TECHNICAL FIELD

The invention relates to a multi-way valve and a multi-way valve skid, belonging to the field of oil and gas gathering and transportation system for such as petroleum and chemical industry, and so on.

BACKGROUND ART

A multi-way valve is an important part for crude oil extraction equipment. The multi-way valve is provided with a number of oil ports, which are connected to pipelines for oil delivery (including a metering pipeline, liquid incoming pipelines and a gathering pipeline). A Chinese patent with application No. 201320031213.1 provides a multi-way valve, of which an upper valve body is arranged with a plurality of oil ports along its circumferential direction, and the corresponding metering pipeline and the liquid incoming pipelines need to be arranged along the circumferential direction of the upper valve body for connection with the oil ports. However, the metering pipeline and the liquid incoming pipelines arranged in such a way makes that the multi-way valve skid (pipelines, the multi-way valve, and fixing parts are collectively referred to as multi-way valve skid) occupies a relatively large space and that the pipeline layout is relatively complicated. In addition, a rotating valve core of the multi-way valve passes through mounting holes of the upper valve body and the lower valve body, and is mounted on the upper valve body and the lower valve body through a rolling bearing. At high temperatures, as the rotary valve core may expand, the diameter and length of the rotary valve core are both greatly increased, especially, the length of the rotary valve core is increased more obviously, therefore, in the installation of the rolling bearing, a certain axial clearance is arranged to compensate for the increase in the length of the rotary valve core. However, the compensation of this kind is limited, which only adapts to the case where the rotary valve core has a smaller amount of elongation; when the rotary valve core has a larger amount of elongation in high temperature environment, the axial clearance of the rolling bearing cannot make the compensation, so that the rotary valve core presses against the rolling bearing, resulting in the rotation of the rotary valve core being not smooth or even jammed. Moreover, in high temperature and high pressure environment, an oil leakage phenomenon is prone to occur in the multi-way valve. In order to solve the above problems, it is needed to take the following points into consideration:

1. The internal structure of the multi-way valve should be reasonably optimized to change the layout of the pipeline.
2. Arranging a reasonable axial clearance of the rotary valve core to prevent the rotary valve core from being jammed during rotation caused by the above reasons.
3. Using a safe and reliable seal to prevent oil leakage, and making the multi-way valve easy to maintain.
4. The rotary valve core is radially positioned to prevent the rotary valve core and the upper valve body from being bonded together or being jammed due to inconsistent expansion thereof resulted from internal and external temperature differences.
5. Speeding up the connection between the pipeline and the multi-way valve, and changing the original flange connection.
6. Reducing processing and installation costs.

SUMMARY OF THE INVENTION

In view of the above-mentioned technical problems existing in the prior art, the present invention provides a multi-way valve, of which the internal structure is optimized and the position of the oil ports is reasonably arranged so as to make the oil transmission pipeline connected thereto take a smaller space and also a smaller area.

To solve the above technical problem, the technical solution applied in this invention is described below.

A multi-way valve comprises an upper valve body, a lower valve body, and a rotary valve core. The rotary valve core comprises a shaft-like valve core body and a protrusion part radially protruding from the valve core body. The rotary valve core is provided with an oil-directing passageway, one end of which runs through the protrusion part and toward an upper end of the lower valve body to form an oil inlet thereof, and the other end runs through a lower end of the rotary valve core to form an oil outlet thereof. The lower valve body is provided with a plurality of oil inlet passageways and a metering passageway, the plurality of oil inlet passageways run through the lower and upper end of the lower valve body to form correspondingly oil inlets and oil outlets thereof. The oil outlet of the oil inlet passageway is located on a circle having a radius of the distance from the oil inlet of the oil-directing passageway to the axis thereof, with the axis of the valve core body as the center of the circle, such that when the valve core body rotates, the oil-directing passageway is capable of abutting with any one of the oil inlet passageways. One end of the metering passageway runs through the lower end of the lower valve body to form a metering port thereof, and the other end communicates with the oil outlet of the oil-directing passageway.

Preferably, the metering passageway and the plurality of inlet passageways are all vertical passageways, so that when the oil-directing passageway is brought into abutting with the oil inlet passageway, the abutted oil inlet passageways, the oil direction passageway and the metering passageway form a U-shaped flow passage through which the oil liquid passes.

Preferably, the inner of the upper valve body is formed with a cavity communicating with the oil inlet passageways and the outside of the valve body is a cylindrical surface, and the upper valve body is formed with a gathering pipeline extending from the outer periphery of the upper valve body and communicating with the cavity.

Preferably, the upper valve body and the lower valve body are respectively provided with a coaxial upper mounting hole and a lower mounting hole. The upper end of the valve core body passes through and extends out of the upper mounting hole and the lower end thereof is located in the lower mounting hole. The valve core body located below the upper valve body is formed with a first stepped surface facing toward the upper valve body. An adjusting nut, located below the valve core body, is provided in the lower mounting hole, the adjusting nut is threadedly connected with a hole wall of the lower mounting hole, and the valve core body is moved up and down by adjusting the adjusting nut, so as to adjust an axial clearance between the first step surface and the upper valve body.

Preferably, an upper shaft sleeve is provided between the upper mounting hole and the valve core body. A lower shaft sleeve is provided between the lower mounting hole and the valve core body. The valve core body is formed with a second stepped surface abutting against an upper end of the lower shaft sleeve. The lower end of the lower shaft sleeve protrudes from the lower end of the valve core body so that the adjusting nut abuts against the lower end of the lower shaft sleeve. The upper shaft sleeve is mounted and provided at a lower portion of the upper valve body so that the first step surface abuts against a lower end of the upper shaft sleeve when the valve core body moves upwardly.

Preferably, the upper end of the lower shaft sleeve is radially extended outward to form a flange, the opposite two surfaces of the flange abut against the second stepped surface and the upper outer edge of the lower mounting hole, respectively. The flange is provided with a plurality of spacing holes. The lower valve body is threadedly connected with a plurality of positioning screws which respectively pass through the spacing holes, and the radial size of the spacing hole is larger than the maximum radial size of screw caps of the positioning screws.

Preferably, an annular gap is formed between the hole wall of the upper mounting hole located in the upper portion of the upper valve body and the valve core body, the annular gap is filled with sealing filler, and the valve core body is sleeved with a pressing sleeve, which is pressed against the sealing filler and is pre-strained by a fastener.

Preferably, abutting ends of the oil-directing passageway and the oil inlet passageway is provided with a valve seat ring. A third stepped surface is formed on the inner wall of the oil-directing passageway. An inner hexagon nut, which is located on the third stepped surface, is arranged in the oil-directing passageway between the valve seat ring and the third stepped surface. The inner hexagon nut is provided with a disc spring, which is deformed under the action of the inner hexagon nut to generate an axial force. And a thrust ring, which pushes downward the valve seat ring under the action of the disc spring, is provided below the disc spring.

The invention also discloses a multi-way valve skid which comprises a metering pipeline, a plurality of liquid incoming pipelines, and the above-mentioned multi-way valve. The liquid supply pipeline and the metering pipeline are both arranged on one side of the lower end of the lower valve body, and the liquid supply pipelines are connected with the oil inlet passageways, and the metering pipeline is connected with the metering passageway.

Preferably, the oil inlets of the oil inlet passageways and the metering port of the metering passageway are all protruded from the lower end of the lower valve body, and the oil inlets of the oil inlet passageways and the liquid incoming pipelines, and the metering port of the metering passageway and the metering passageway, are connected respectively therebetween through clamps or quick connectors.

Compared with the prior art, the multi-way valve and the multi-way valve skid thereof according to the present invention have the following advantageous effects:

1. The plurality of oil inlet passageways and the metering passageway each run through to the lower end of the lower valve body so that the pipelines, after being connected, are located on the same side of the multi-way valve. This configuration makes the arrangement of the pipeline simple, and the multi-way valve skid (the pipeline, the multi-way valve, and fixing parts are collectively referred to as multi-way valve skid) occupies small space and area.

2. The axial clearance between the first stepped surface of the rotary valve core of the multi-way valve of the present invention and the upper valve body is substantially the axial clearance of the rotary valve core (or the valve core body, the same hereafter). Therefore, the axial clearance of the rotary valve core can be adjusted by rotating the adjusting nut, and more importantly, when the ambient temperature changes, the axial position of the rotary valve core can be changed by rotating the adjusting nut so as to compensate the amount of change in the length of the rotary valve core, so that the rotary valve core can always has a reasonable axial clearance, and that the rotary valve core can be flexibly rotated at different temperatures.

3. In a preferred embodiment of the present invention, the rotary valve core is positioned radially through the upper shaft sleeve provided on the upper valve body and the lower shaft sleeve provided on the lower valve body, so that the rotary valve core can withstand a certain radial load, and the upper shaft sleeve and the lower shaft sleeve are simple in structure and easy to install.

4. In a preferred embodiment of the present invention, the sealing filler is filled between the upper valve body of the multi-way valve and the rotary valve core. The sealing filler can effectively prevent the oil in the multi-way valve from leakage from the upper valve body, this form of sealing is of reliable installation, with long-term use and maintenance-free.

DESCRIPTION OF THE REFERENCE NUMERALS

10—upper valve body; 11—gathering pipeline; 20—lower valve body; 21—oil inlet passageways; 22—metering passageway; 30—rotary valve core; 31—valve core body; 32—protrusion part; 33—oil-directing passage; 34—first stepped surface; 35—second stepped surface; 36—third stepped surface; 41—metering pipeline; 42—liquid incoming pipelines; 50—clamps; 60—adjusting nut; 71—flange; 72—positioning screws; 80—upper shaft sleeve; 90—valve seat ring; 91—inner hexagon nut; 92—disc spring; 93—thrust ring; 100—seal filler; 102—nut.

DETAILED DESCRIPTION

To enable those skilled in the art understand the technical scheme of present invention better, the invention will be further described in detail with the figures and specific embodiments.

Figure 1:
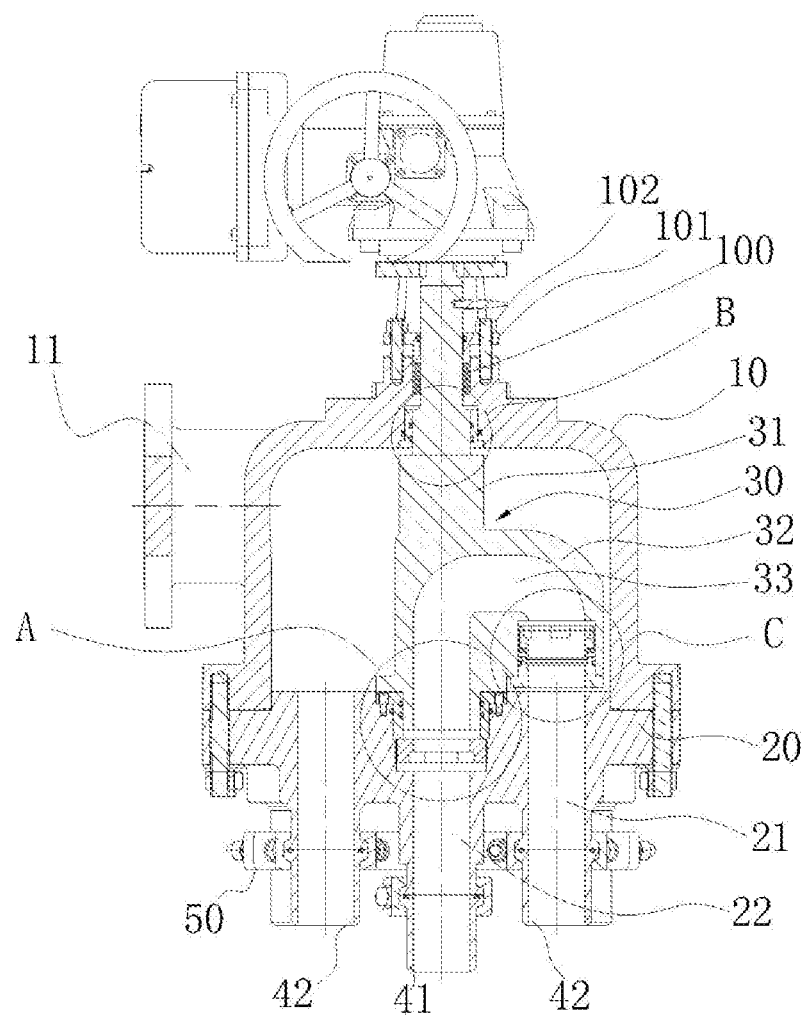
FIG. 1 is a structural schematic view of an embodiment of the multi-way valve according to the present invention.

As shown in FIG. 1, an embodiment of the present invention provides a multi-way valve, which is used for high temperature high pressure environment. The multi-way valve comprises an upper valve body 10, a lower valve body 20, and a rotary valve core 30, wherein the upper valve body 10 is mounted together with the lower valve body 20, and the upper valve body 10 and the lower valve body 20 are sealed through a sealing structure or a sealing member therebetween. The rotary valve core 30 comprises a shaft-like valve core body 31 and a protrusion part 32 radially protruding from the valve core body 31. The rotary valve core 30 is provided with an oil-directing passageway 33, one end of which runs through the protrusion part 32 and points toward an upper end of the lower valve body 20 to form an oil inlet thereof and the other end runs through a lower end of the valve core body 31 to form an oil outlet thereof. The lower valve body 20 is provided with a plurality of oil inlet passageways 21 and a metering passageway 22, the plurality of oil inlet passageways 21 running through the lower end and the upper end of the lower valve body 20 to correspondingly form oil inlets and oil outlets thereof. The oil outlet of the oil inlet passageway 21 is located on a circle, which has a radius of the distance from the oil inlet of the oil-directing passageway 33 to the axis thereof, with the axis of the valve core body 31 as the center of the circle, such that when the valve core body 31 rotates, the oil-directing passageway 33 is capable of abutting with any one of the oil inlet passageways 21. One end of the metering passageway 22 runs through to the lower end of the lower valve body 20 to form a metering port thereof, and the other end communicates with the oil outlet of the oil-directing passageway 33.

The structure of the multi-way valve of the present invention is optimized. The plurality of oil inlet passageways 21 and the metering passageway 22 in the multi-way valve all run through to the lower end of the lower valve body 20, so that the pipelines, after being connected, are located on the same side of the multi-way valve. This configuration makes the arrangement of the pipeline simple, and the space and area occupied by the multi-way valve skid (the pipeline, the multi-way valve, and fixing parts are collectively referred to as multi-way valve skid) are small. Meanwhile, the structure of the multi-way valve facilitates casting processing, saves processing cost, and is convenient for disassembly and easy for maintenance.

The oil inlet passageways 21 and the metering passageway 22 can be a curved passageway or a vertical one. In order to enable the oil therein flow smoothly and to reduce the processing cost, in a preferred embodiment of the present invention, as shown in FIG. 1, the metering passageway 22 and the plurality of oil inlet passageways 21 are all vertical passageways, such that when the oil-directing passageway 33 abuts with the oil inlet passage 21, the abutted oil inlet passageways 21, the oil-directing passageway 33 and the metering passageway 22 can form a U-shaped flow passage for the oil to pass through.

Figure 5:
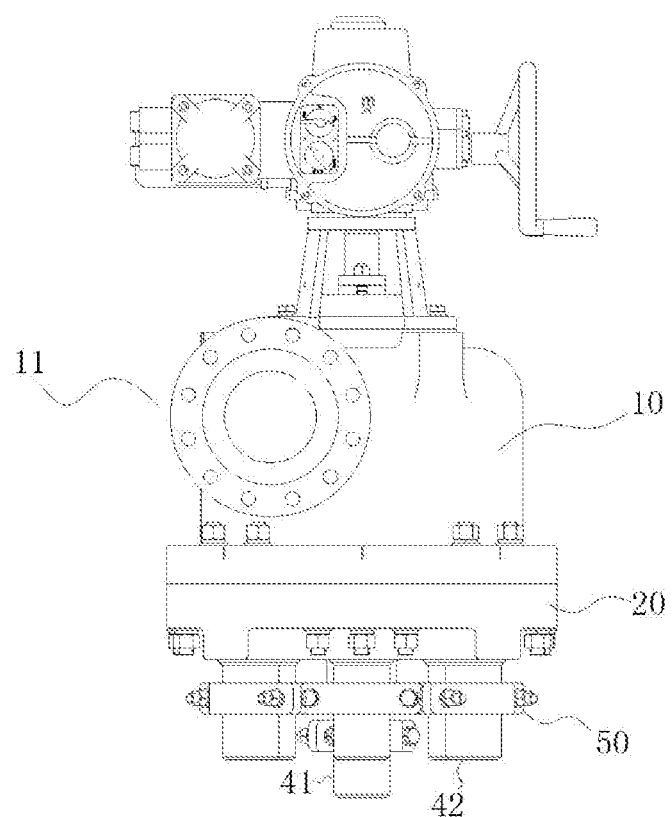
FIG. 5 is a left view of FIG. 1.
Figure 6:
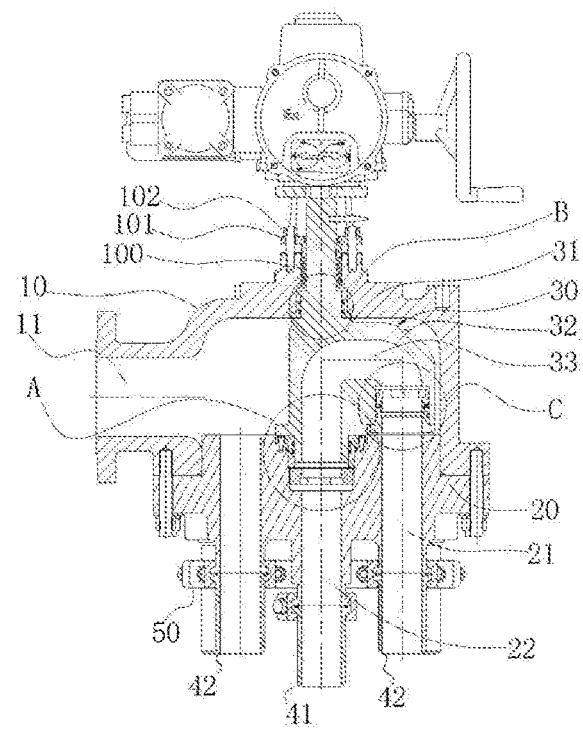
FIG. 6 is a structural schematic view of another embodiment of the multi-way valve according to the present invention.
Figure 7:
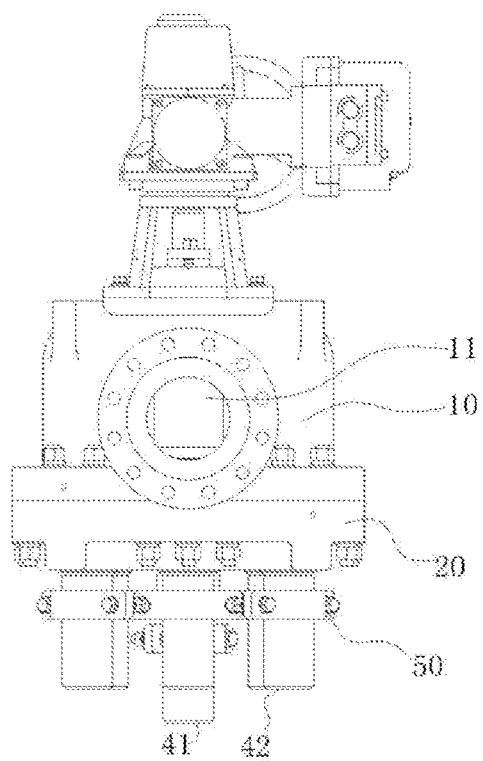
FIG. 7 is a left view of FIG. 6.

The upper valve body 10 and the lower valve body 20 may use various structures and profiles. In a preferred embodiment of the present invention, as shown in FIGS. 1, 5, 6 and 7, the lower valve body 20 is provided in a disc-like structure, the outside of the upper valve body 10 is a cylindrical surface wherein a cavity is formed, and the cavity communicates with the oil inlet passageways 21, and the upper valve body 10 is formed with a gathering pipeline 11, one end of which is communicated with the cavity in the upper valve body 10 and further communicates with the oil inlet passageways 21, and the other end extends outward from the outer periphery of the upper valve body 10. As shown in FIGS. 1 and 5, the gathering pipeline 11 of the multi-way valve extends in the tangential direction to the outer periphery of the upper valve body 10, and the multi-way valve is adapted to be horizontally placed, namely, the state of the multi-way valve as shown in FIG. 5 is rotated by 90° to the left. The gathering pipeline 11 of the multi-way valve as shown in FIGS. 6 and 7 extends radially from the middle of the outer periphery of the upper valve body 10, the lower edge of the port of the gathering pipeline 11 is almost located in the same plane as the oil outlets of the oil inlet passageways 21, and this multi-way valve is adapted to be vertically placed. The advantages by arranging the above-mentioned gathering pipeline 11 in such a manner is that when the multi-way valve is placed in different manners, the gathering pipeline 11 enables that impurities such as sediment will be deposited inside the multi-way valve.

Figure 2:
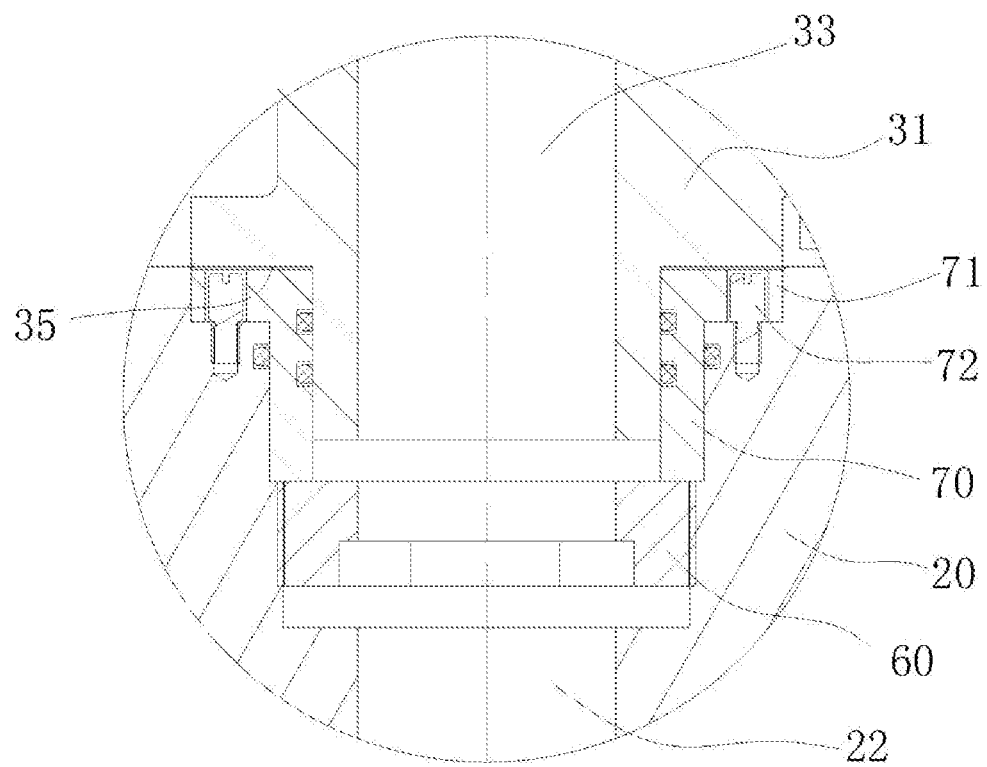
FIG. 2 is an enlarged view of part A in FIG. 1.
Figure 3:
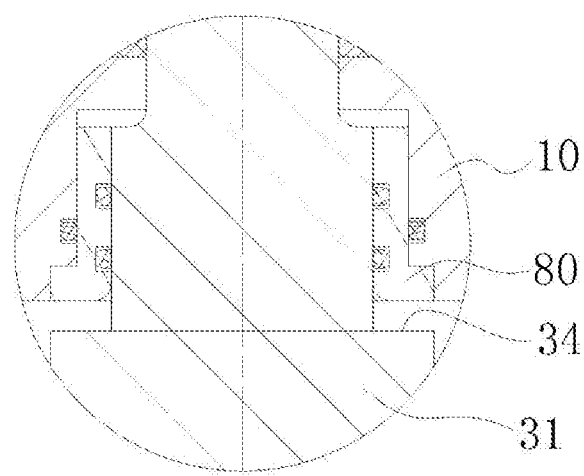
FIG. 3 is an enlarged view of part B in FIG. 1.

In a preferred embodiment of the present invention, as shown in FIGS. 1 to 3, the upper valve body 10 is provided with an upper mounting hole, the lower valve body 20 is provided with a lower mounting hole which is coaxial with the upper mounting hole, and the metering passageway 22 on the lower valve body 20 is in communication with the lower mounting hole. The rotating valve core 31 runs through the upper mounting hole of the upper valve body 10 and the lower mounting hole of the lower valve body 20, and the upper end of the valve core body 31 extends out of the upper valve body 10 and the lower end thereof extends into a section of the lower mounting hole of the lower valve body 20. The valve core body 31 does not extend into a portion of the lower mounting hole, where an adjusting nut 60 is provided abutting against the lower end of the valve core body 31. The adjusting nut 60 is an inner hexagon nut, the outer periphery of which is provided with an external thread, and the adjusting nut 60 is threadedly connected with the lower mounting hole. An annular first stepped surface 34 facing toward the upper valve body 10 is formed on the valve core body 31 near the lower end of the upper valve body 10, with the valve core body 31 being equal to a stepped shaft having a shaft shoulder, and the first stepped surface being equal to the shaft shoulder of the stepped shaft. In this way, the adjustment nut 60 is adjusted by using a special tool extending inward from the metering passageway 22 to make the rotary valve core 30 move up and down, so as to adjust the axial clearance between the first stepped surface 34 and the upper valve body 10.

It can be seen from the above that the axial clearance between the first stepped surface 34 and the upper valve body 10 is substantially the axial clearance of the rotary valve core 30 (or the valve core body 31, the same hereafter). That is, the axial amount of play of the rotary valve core 30 is equal to the axial clearance amount between the rotary valve core 30 and the upper valve body 10. By rotating the adjusting nut 60, the different amount of elongation of the rotary valve core 30 due to different temperatures can be compensated, such that the rotary valve core 30 has a reasonable axial clearance at different temperatures, and that the rotary valve core 30 can be flexibly rotated at different temperatures.

The axial clearance of the rotary valve core 30 of the multi-way valve of the present invention is adjustable and the adjustment range is large. Therefore, the rotary valve core 30 can be flexibly rotated in a relatively large temperature range, especially in high temperature environment, by rotating the adjusting nut 60, the rotary valve core 30 will not be jammed due to excessive amount of elongation thereof.

To achieve the radial positioning of the rotary valve core 30, in a preferred embodiment of the present invention, as shown in FIGS. 1-3, an upper shaft sleeve 80 is provided between the upper mounting hole and the valve core body 31, and a lower shaft sleeve 70 is provided between the lower mounting hole and the valve core body 31. The upper shaft sleeve 80 is in interference fit with the upper valve body 10 and the upper shaft sleeve 80 is in clearance fit with the rotary valve core 30 to prevent the upper sleeve 80 from rotating together with the valve core body 31. The hardness of the upper shaft sleeve 80 and the lower shaft sleeve 70 is smaller than the hardness of the valve core body 31, so that the wear amount of the valve core body 31 is smaller than the wear amount of the upper shaft sleeve 80 and the lower shaft sleeve 70, and it also prevents the upper shaft sleeve 80 and the lower shaft sleeve 70 from scratching the surface of the valve core body 31 when the valve core body 31 is rotated. More importantly, if the valve core body 31 has the same hardness as the upper shaft sleeve 80 and the lower shaft sleeve 70, the valve core body 31 is easy to be jammed. Thanks to the difference in hardness between the valve core body 31 and the upper shaft sleeve 80 and the lower shaft sleeve 70, the rotation of the valve core body 31 is more flexible, which can effectively prevent the valve core body 31 from being jammed. Preferably, difference between the hardness of the valve core body 31 and that of the upper shaft sleeve 80 and the lower shaft sleeve 70 is HRC5 to HRC6. In the present embodiment, the valve core body 31 is formed with a second stepped surface 35 which abuts against the upper end of the lower shaft sleeve 70, and the lower end of the lower shaft sleeve 70 protrudes from the lower end of the valve core body 31 and abuts against the adjusting nut 60. The upper shaft sleeve 80 is provided in the lower portion of the upper valve body 10 and the upper shaft sleeve 80 is positioned in such a manner that the first stepped surface 34 abuts against the lower end of the upper shaft sleeve 80 when the valve core body 31 is moved upwardly. In this way, the adjusting nut 60 moves the valve core body 31 up and down by pushing against the lower shaft sleeve 70, so as to prevent resistance to the rotation of the valve core body 31 due to the adjusting nut 60 directly abuts against the valve core body 31. And since the valve core body 31, after being moved upward, abuts against the upper shaft sleeve 80 rather than the lower end of the upper valve body 10, the lower end of the upper valve body 10 needs not to be processed and the processing cost is saved.

In order to prevent the lower shaft sleeve 70 from rotating with the rotary valve core 30, in a preferred embodiment of the present invention, as shown in FIGS. 1 and 2, the upper end of the lower shaft sleeve 70 is radially extended outward to form a flange 71, with the opposite two surfaces of the flange 71 abutting against the second stepped surface 35 and the upper outer edge of the lower mounting hole, respectively. The flange 71 is provided with a plurality of spacing holes. The lower valve body 20 is threadedly connected with a plurality of positioning screws 72 which respectively pass through the spacing holes, and the radial sizes of the spacing holes are larger than the maximum radial size of screw caps of the positioning screws 72. In this way, the lower shaft sleeve 70 will not rotate together with the valve core body 31 thanks to the restriction of the positioning screws 72. In order to prevent the oil in the multi-way valve from leaking from the gap between the lower shaft sleeve 70 and the lower valve body 20 and the gap between the lower shaft sleeve 70 and the valve core body 31, in the present embodiment, a sealing ring is provided between the lower shaft sleeve 70 and the lower valve body 20 and between the lower shaft sleeve 70 and the valve core body 31.

It is needed to form a seal between the upper valve body 10 and the valve core body 31, in order to prevent the oil in the multi-way valve from leaking from the gap between the upper valve body 10 and the valve core body 31. Specifically, as shown in FIG. 1, a counterbore is formed at the upper end of the upper mounting hole, the wall of the counterbore forms an annular gap with the valve core body 31, and the annular gap is filled with the sealing filler 100 (the material of the sealing filler 100 may be graphite). The pressing sleeve 101 sleeved on the valve core body 31 is pressed against the sealing filler 100 and is pre-strained by the fasteners so that the pressing sleeve 101 always maintains a certain pressure on the sealing filler 100. The fasteners in the present embodiment are a double-headed stud, which is threadedly connected on the upper end surface of the upper valve body 10, and a nut 102 sleeved on the double-headed stud. The pressure of the pressing sleeve 101 on the sealing filler 100 is adjusted by rotating the nut 102, so that the sealing filler 100 can realize good sealing effect at different temperatures and pressures.

Figure 4:
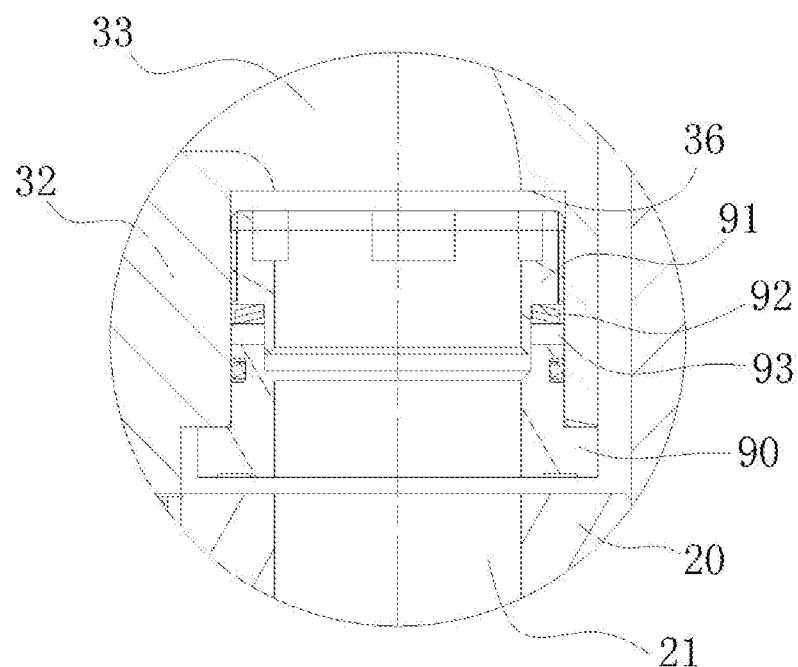
FIG. 4 is an enlarged view of part C in FIG. 1.

In a preferred embodiment of the present invention, when the valve core body 31 is rotated to a position where the oil-directing passageway 33 abuts with one of the oil inlet passageways 21, in order to achieve the sealing of the oil-directing passageway 33 and the oil inlet passageways 21, as shown in FIGS. 1 and 4, the valve seat ring 90 is provided at the abutting ends of the oil-directing passageway 33 and the oil inlet passageway 21, and a third stepped surface 36 is formed on the inner wall of the oil-directing passageway 33. The inner hexagonal nut 91, which is located on the third stepped surface 36, is provided in the oil-directing passageway 33 between the valve seat ring 90 and the third stepped surface 36, and the inner hexagonal nut 91 is provided with a disc spring 92, which is deformed under the action of the inner hexagon nut 91, so as to generate an axial force. A thrust ring 93 is provided below the disc spring 92, for pushing the seat ring 90 downwardly under the action of the disc spring 92.

Before the multi-way valve operates in a high temperature and high pressure environment, the adjusting nut 60 is rotated counterclockwise by means of a special tool by 70 to 90 degrees, so that the axial clearance of the rotary valve core 30 is maintained at 0.58 mm to 0.75 mm. In this way, when the multi-way valve operates at high temperature and high pressure, the rotary valve core 30 has a sufficient axial clearance for flexible rotation thereof after thermal expansion.

The present invention also discloses a multi-way valve skid, comprising, as shown in FIGS. 1 and 5, a plurality of liquid incoming pipelines 42, a metering pipeline 41, a gathering pipeline and fixing members, besides, it also comprises the above-mentioned multi-way valve. The plurality of liquid incoming pipelines 42 and the metering pipeline 41 are all arranged on one side of the lower end of the lower valve body 20, and the plurality of liquid supply pipelines 42 are connected (in a manner of one-to-one correspondence) with the plurality of oil feed passages 21. The metering pipeline 41 is connected to the metering channel 22 and the gathering pipeline is connected to the metering pipeline 11. In the present embodiment, the oil inlets of the oil inlet passageways 21 and the metering port of the metering passageway 22 all protrude from the lower end of the lower valve body 20, and the oil inlets of the oil inlet passageways 21 and the liquid incoming pipelines 42, as well as the metering port of the metering passageway 22 and the metering pipeline 41, are connected via clamps 50 or quick connectors, respectively. Through the clamps 50 or the quick connectors (FIGS. 1, 5, 6 and 7 show the manner of connection via clamps 50), the connections of the pipelines are more convenient and quick.

In summary, the advantages of the multi-way valve and the multi-way valve skid of the present invention are as follows:

1. The plurality of oil inlet passageways 21 and the metering passageway 22 of the multi-way valve of present invention all run through to the lower end of the lower valve body 20, so that the pipelines, after being connected, are located on the same side of the multi-way valve. This configuration makes the arrangement of the pipelines simple, further makes the space and area occupied by the multi-way valve skid (the multi-way valve, the pipeline, and fixing parts are collectively referred to as multi-way valve skid), small.

2. The invention optimizes the structure of the multi-way valve, makes the multi-way valve easier to cast, saves the processing cost, and is easy to disassemble and maintain.

3. In a preferred embodiment of the present invention, the oil inlet passages and the metering passage of the multi-way valve are connected to the corresponding pipelines by means of quick connectors or clamps 50. It changes the flanges connection in the prior art to make the connection rapider and more convenient.

4. The axial clearance between the first stepped surface 34 of the rotary valve core 30 and the upper valve body 10 of the multi-way valve of the present invention is substantially the axial clearance of the rotary valve core 30 (or the valve core body, the same hereafter). Therefore, the axial clearance of the rotary valve core 30 can be adjusted by rotating the adjusting nut 60. And more importantly, when the ambient temperature changes, the axial position of the rotary valve core 30 can be changed by rotating the adjusting nut 60, so as to compensate the amount of change in the length of the rotary valve core 30, so that the rotary valve core 30 can always has a reasonable axial clearance, and that the rotary valve core 30 can be flexibly rotated at different temperatures.

5. In a preferred embodiment of the present invention, the rotary valve core 30 is positioned radially by an upper shaft sleeve 80 provided on the upper valve body 10 and a lower shaft sleeve 70 provided on the lower valve body 20, so that the rotary valve core 30 can withstand a certain radial load, and the structures of the upper shaft sleeve 80 and the lower shaft sleeve 70 are simple and is easy to install.

6. In a preferred embodiment of the present invention, a sealing filler 100 is filled between the upper valve body 10 and the rotary valve core 30 of the multi-way valve. The sealing filler 100 can effectively prevent the oil in the multi-way valve from leakage from the upper valve body 10. This form of sealing is of reliable installation, with long-term use and maintenance-free.

The above embodiments are merely exemplary embodiments of the present invention and are not intended to limit the invention, while the protection scope of present invention is defined by the claims. A person skilled in the art may make various modifications or equivalent substitutions to the present invention within its essence and protection scope, and said modifications or equivalent substitutions should be regarded as falling in the protection scope of the present invention.

The invention claimed is:

1. A multi-way valve, comprising:
   an upper valve body,
   a lower valve body, and
   a rotary valve core, wherein the rotary valve core comprises:
      a shaft-like valve core body;
      a protrusion part radially protruding from the valve core body; and
      an oil-directing passageway, one end of which runs through the protrusion part and points toward an upper end of the lower valve body to form an oil inlet thereof, and another end running through a lower end of the valve core body to form an oil outlet thereof,
   wherein the lower valve body comprises a plurality of oil inlet passageways and a metering passageway, the plurality of oil inlet passageways running through a lower end of the lower valve body and the upper end of the lower valve body to correspondingly form oil inlets and oil outlets thereof,
   wherein the oil outlets of the plurality of oil inlet passageways are located on a circle having a radius of the distance from the oil inlet of the oil-directing passageway to an axis thereof, and a center of the circle being an axis of the valve core body, such that when the valve core body rotates, the oil-directing passageway is configured to abut with any one of the oil inlet passageways, and
   wherein one end of the metering passageway runs through the lower end of the lower valve body to form a metering port thereof, and the other end communicates with the oil outlet of the oil-directing passageway,
   wherein the upper valve body and the lower valve body are respectively provided with a coaxial upper mounting hole and a lower mounting hole; an upper end of the valve core body runs through and extends out of the upper mounting hole and the lower end thereof is located in the lower mounting hole; the valve core body located below the upper valve body is formed with a first stepped surface facing towards the upper valve body; an adjusting nut located below the valve core body is provided in the lower mounting hole, the adjusting nut being threaddedly connected with a hole wall of the lower mounting hole; and the valve core body is moved up and down by adjusting the adjusting nut, so as to adjust an axial clearance between the first stepped surface and the upper valve body.

2. The multi-way valve according to claim 1, wherein the metering passageway and the plurality of oil inlet passageways are all vertical passageways, so that when the oil-directing passageway abuts with an oil inlet passageway, the abutted oil inlet passageway, the oil-directing passageway, and the metering passageway form a U-shaped flow passage for an oil liquid to pass through.

3. The multi-way valve according to claim 1, wherein an inside of the upper valve body is formed with a cavity communicating with the oil inlet passageways and an outside of the upper valve body is a cylindrical surface; and wherein a gathering pipeline, which extends outwardly from an outer periphery of the upper valve body and communicates with the cavity, is formed on the upper valve body.

4. The multi-way valve according to claim 1, wherein an upper shaft sleeve is provided between the upper mounting hole and the valve core body; a lower shaft sleeve is provided between the lower mounting hole and the valve core body; the valve core body is formed with a second stepped surface abutting against an upper end of the lower shaft sleeve; the lower end of the lower shaft sleeve protrudes from the lower end of the valve core body so that the adjusting nut abuts against the lower end of the lower shaft sleeve; and the upper shaft sleeve is mounted at a lower portion of the upper valve body so that the first stepped surface abuts against a lower end of the upper shaft sleeve when the valve core body moves upwardly.

5. The multi-way valve according to claim 4, wherein the upper end of the lower shaft sleeve is radially extended outward to form a flange, the opposite two surfaces of the flange abutting against the second stepped surface and the upper outer edge of the lower mounting hole, respectively; the flange is provided with a plurality of spacing holes; and the lower valve body is threaddedly connected with a plurality of positioning screws which respectively pass through the spacing holes, the radial size of the spacing hole being larger than the maximum radial size of screw caps of the positioning screws.

6. The multi-way valve according to claim 1, wherein an annular gap is formed between the hole wall of the upper mounting hole located in the upper portion of the upper valve body and the valve core body, the annular gap is filled with a sealing filler, and the valve core body is sleeved with a pressing sleeve, which is pressed against the sealing filler and is pre-strained by fasteners.

7. The multi-way valve according to claim 1, wherein abutting ends of the oil-directing passageway and each oil inlet passageway are provided with a valve seat ring; a third stepped surface is formed on an inner wall of the oil-directing passageway; an inner hexagon nut, which is located on the third stepped surface, is arranged in the oil-directing passageway between the valve seat ring and the third stepped surface; a disc spring is provided on the inner hexagon nut, and the disc spring is deformed under an action of the inner hexagon nut to generate an axial force; and a thrust ring is provided below the disc spring for pushing downward the valve seat ring under an action of the disc spring.

8. A multi-way valve skid which comprises a metering pipeline and a plurality of liquid supply pipelines, wherein the multi-way valve skid further comprises a multi-way valve according to claim 1; the liquid supply pipelines and the metering pipeline are both arranged on one side of the lower end of the lower valve body; the liquid supply pipelines are connected with the oil inlet passageways; and the metering pipeline is connected with the metering passageway.

9. The multi-way valve skid according to claim 8, wherein the oil inlets of the oil inlet passageways and the metering port of the metering passageway are all protruded from the lower end of the lower valve body, the oil inlets of the oil inlet passageway are connected with the liquid supply pipelines and the metering port of the metering passageway is connected with the metering pipeline, respectively, through clamps or quick connectors.

* * * * *